United States Patent [19]
Pletcher et al.

[11] Patent Number: 5,973,819
[45] Date of Patent: Oct. 26, 1999

[54] METHOD AND APPARATUS FOR CONTROLLING AN ELECTROCHROMIC DEVICE

[75] Inventors: Timotny A. Pletcher, Eastampton, N.J.; Walter P. Sjursen, Washington Crossing, Pa.

[73] Assignee: PPG Industries Ohio, Inc., Cleveland, Ohio

[21] Appl. No.: 09/157,725

[22] Filed: Sep. 21, 1998

[51] Int. Cl.⁶ .................................................... G02F 1/163
[52] U.S. Cl. ...................... 359/265; 359/267; 359/603; 359/604; 351/44; 351/45
[58] Field of Search ................................. 359/265, 267, 359/275; 351/44, 45; 345/105

[56] References Cited

U.S. PATENT DOCUMENTS

| | | | |
|---|---|---|---|
| 3,630,603 | 12/1971 | Letter | 351/44 |
| 3,972,040 | 7/1976 | Hilsum et al. | 340/324 M |
| 4,210,907 | 7/1980 | Hamada et al. | 340/785 |
| 4,219,809 | 8/1980 | Schwarzschild et al. | 340/785 |
| 4,298,870 | 11/1981 | Saegusa | 340/785 |
| 4,512,637 | 4/1985 | Ballmer | 350/357 |
| 4,529,275 | 7/1985 | Ballmer | 350/357 |
| 4,832,468 | 5/1989 | Ito et al. | 350/357 |
| 4,892,394 | 1/1990 | Bidabad | 350/357 |
| 5,365,365 | 11/1994 | Ripoche et al. | 359/267 |
| 5,402,144 | 3/1995 | Ripoche | 345/105 |
| 5,455,637 | 10/1995 | Kallman et al. | 351/44 |
| 5,455,638 | 10/1995 | Kallman et al. | 351/44 |
| 5,471,338 | 11/1995 | Yu et al. | 359/273 |
| 5,486,952 | 1/1996 | Nagao et al. | 359/603 |
| 5,552,841 | 9/1996 | Gallorini et al. | 351/49 |
| 5,581,406 | 12/1996 | Kobayashi et al. | 359/604 |
| 5,587,828 | 12/1996 | Bernard, Jr. | 359/275 |
| 5,604,626 | 2/1997 | Teowee et al. | 359/265 |
| 5,608,567 | 3/1997 | Grupp | 359/275 |
| 5,671,035 | 9/1997 | Barnes | 351/45 |

FOREIGN PATENT DOCUMENTS

WO 97/28484   8/1997   WIPO.

OTHER PUBLICATIONS

U.S. Patent Application Serial No. 09/157,723 entitled "Method and Apparatus for Controlling an Electrochromic Device", filed Sep. 18, 1998, by Walter P. Sjursen et al.
U.S. Patent Application Serial No. 09/157,724 entitled "Apparatus for Controlling an Electrochromic Device", filed Sep. 18, 1998, by Walter P. Sjursen.
U.S. Patent Application Serial No. 09/046,386 entitled "Method for Forming a Molded Edge Seal", filed Mar. 23, 1998, by John E. Smarto, et al.

*Primary Examiner*—Scott J. Sugarman
*Assistant Examiner*—Margaret Burke
*Attorney, Agent, or Firm*—William C. Mitchell

[57] ABSTRACT

The invention comprises an apparatus and methodology facilitating an accurate, user-friendly system for controlling the charge state (i.e., color level) of an electrochromic device. The invention provides a two button control methodology implemented as a sequential logic controller or, in another embodiment, a microprocessor-based controller. After initiation via, e.g., an external switch, the invention iteratively modifies and measures a charge level of the electrochromic device until an additional switch activation or until a maximal or minimal charge level is achieved.

20 Claims, 7 Drawing Sheets

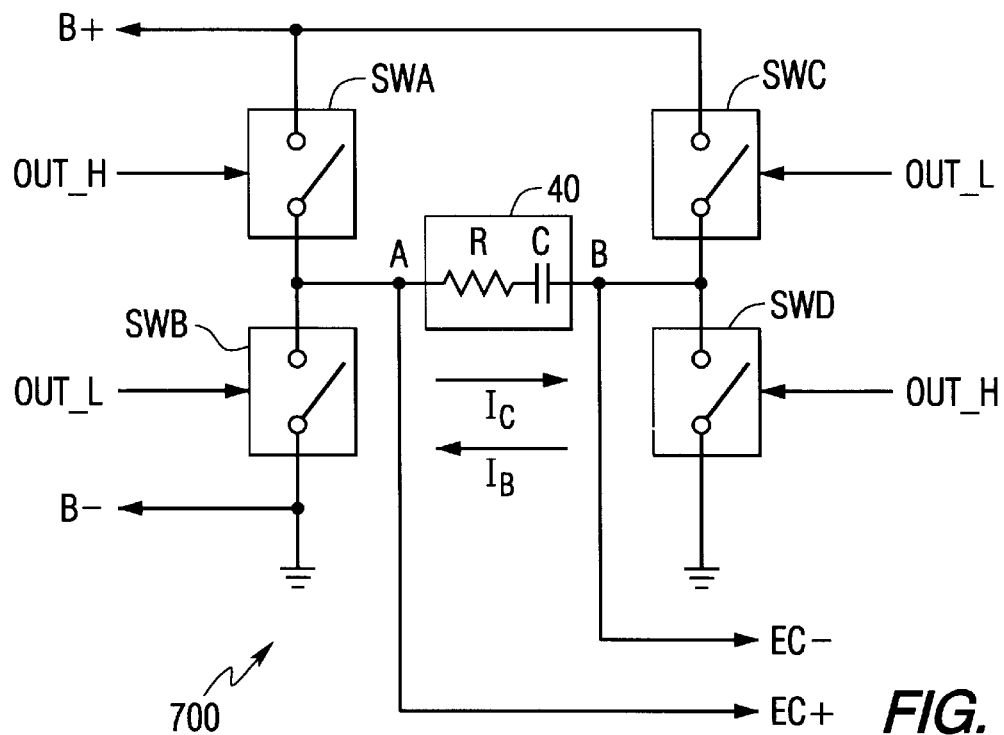
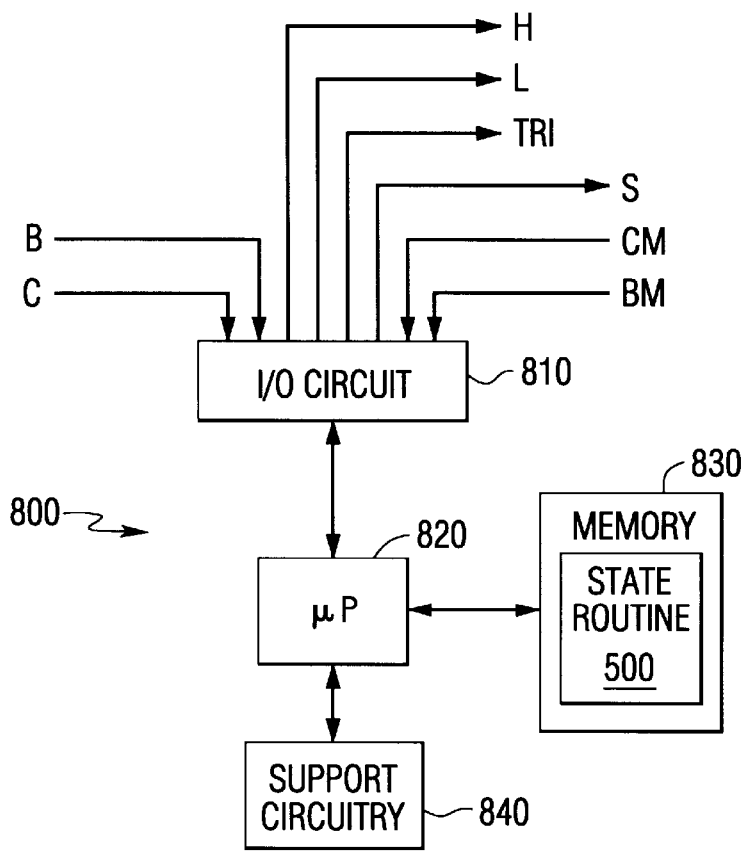

METHOD AND APPARATUS FOR CONTROLLING AN ELECTROCHROMIC DEVICE

The invention relates to the control of electrochromic devices, more particularly, the invention relates to a control apparatus and binary methodology suitable for use in an electrochromic device control system.

BACKGROUND OF THE DISCLOSURE

The optical properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device utilizes reversible oxidation and reduction reactions to achieve optical switching.

Conventional electrochromic devices comprise at least one thin film of a persistent electrochromic material, i.e., a material which, in response to application of an electric field of given polarity, changes from a high-transmittance, non-absorbing state to a low-transmittance, absorbing or reflecting state. Since the degree of optical modulation is directly proportional to the current flow induced by the applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, an electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer. The electrochromic film(s) and ion-conductive material are disposed between two electrodes, forming a laminated cell.

When the electrode adjacent to the electrochromic film is the cathode, application of an electric field causes darkening of the film. Reversing the polarity causes electrochromic switching, and the film reverts to its high-transmittance state. Typically, an electrochromic film such as tungsten oxide is deposited on a substrate coated with an electroconductive film such as tin oxide or indium tin oxide to form one electrode. The counter electrode is typically a similar tin oxide or indium tin oxide coated substrate.

Since an electrochromic device may be modeled as a non-linear passive device having an impedance dominated by a capacitive component, the amount of charge transferred to an electrochromic device is typically controlled by utilizing current sources and current sinks.

Unfortunately, present control methodologies tend to be directed towards ease of use and accuracy, but not both. Therefore it is seen to be desirable to provide a method and apparatus facilitating ease of use and accuracy within the context of an electrochromic control system.

SUMMARY OF THE INVENTION

The invention comprises an apparatus and methodology facilitating an accurate, user-friendly system for controlling the charge state (i.e., color level) of an electrochromic device. The invention provides a two button control methodology implemented as a sequential logic controller or, in another embodiment, a microprocessor-based controller. After initiation via, e.g., an external switch, the invention iteratively modifies and measures a charge level of the electrochromic device until an additional switch activation or until a maximal or minimal charge level is achieved.

Specifically, an apparatus according to the invention for controlling a charge state of an electrochromic device comprises a driver, coupled to the electrochromic device, for selectively imparting one of a positive charge and a negative charge to the electrochromic device in response to a charge control signal; a detector, coupled to the electrochromic device, for measuring a voltage level of the Electrochromic device and responsively producing charge-indicative output signal; and a controller, coupled to the driver and the detector, for adapting a charge level of the electrochromic device in response to an input control signal. The controller, in a first operating mode, causing the driver to impart charge to the electrochromic device during a first period of time, and to stop imparting charge for during a second period of time, the controller entering the first operating mode in response to the input signal being indicative of the electrochromic device having an insufficient charge level, the controller exiting the first operating mode in response to either the input signal being indicative of the electrochromic device having an appropriate charge level or the charge-indicative output signal from the detector indicating that the electrochromic device has achieved a maximal charge level; and, in a second operating mode, causing the driver to remove charge from the electrochromic device during the first period of time, and to stop removing charge during the second period of time, the controller entering the second operating mode in response to the input signal being indicative of the electrochromic device having an excessive charge level, the controller exiting the second operating mode in response to either the input signal being indicative of the electrochromic device having an appropriate charge level or the charge-indicative output signal from the detector indicating that the electrochromic device has achieved a minimal charge level.

A method according to the invention comprises and suitable for use in a system for controlling a charge state of an electrochromic device, where the system includes a driver for imparting charge to the electrochromic device, a controller, for adapting the driver in response to a first control signal and a second control signal; and a comparator, for comparing a voltage level of the electrochromic device to an upper threshold level and producing therefrom an upper threshold indicative output signal, and for comparing the voltage level of the electrochromic device to a lower threshold level and producing therefrom a lower threshold indicative output signal, comprises the steps of: entering, in response to an assertion of only the first control signal, a charge mode of operation, wherein the controller causes the driver to impart charge to the electrochromic device; entering, in response to an assertion of only the second control signal, a discharge mode of operation, wherein the controller causes the driver to remove charge from the electrochromic device; and entering, in response to an assertion of the first and second control signals, an idle mode of operation, wherein the controller causes the driver to stop modifying the charge of the electrochromic device.

BRIEF DESCRIPTION OF THE DRAWINGS

The teachings of the present invention can be readily understood by considering the following detailed description in conjunction with the accompanying drawings, in which:

FIG. 7 is a schematic diagram of a relatively high power electrochromic driver suitable for use with the electrochromic control system of FIG. 6; and FIG. 8 depicts an embodiment of a controller according to the invention and suitable for use in the electrochromic control apparatus of FIG. 3A and FIG. 6.

To facilitate understanding, identical reference numerals have been used, where possible, to designate identical elements that are common to the figures.

DETAILED DESCRIPTION

Figure 1:
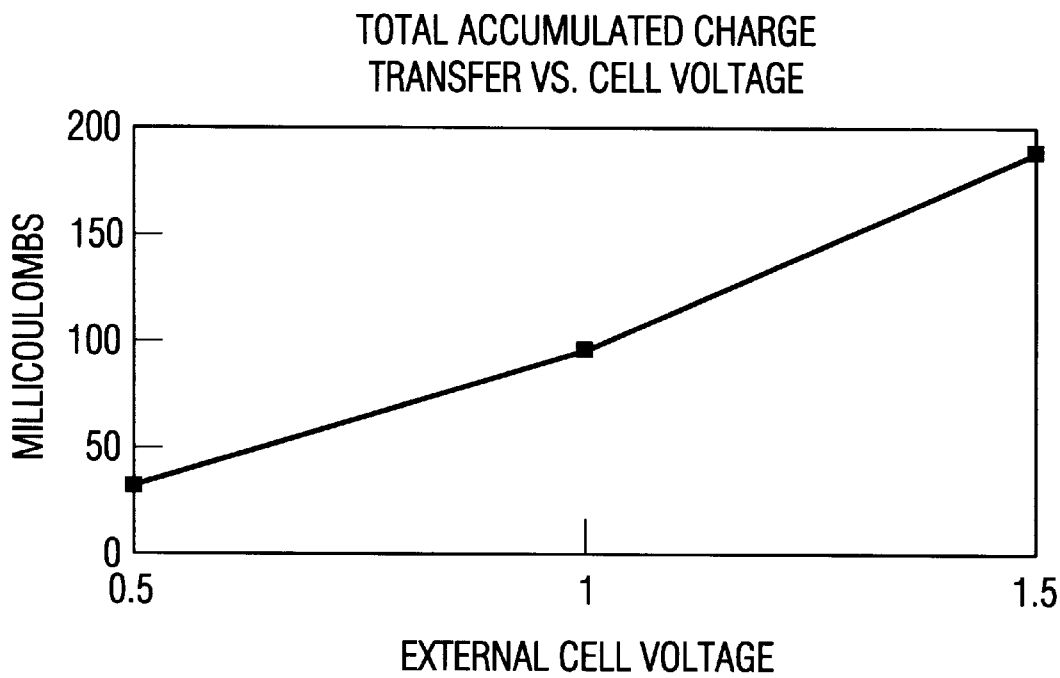
FIG. 1 depicts a graphical representation of electrochromic device accumulated charge transfer as a function of voltage under substantially quiescent conditions.

FIG. 1 depicts a graphical representation of electrochromic device, or cell, accumulated charge transfer as a function of voltage under substantially quiescent conditions. Specifically, FIG. 1 shows the non-linear relationship between the external cell voltage and the accumulated charge transfer of the electrochromic cell. For example, an external cell voltage of 0.5 volts indicates an accumulated charge transfer level of approximately 35 milliCoulombs; an external cell voltage of 1 volt indicates an accumulated charge transfer level of approximately 100 millicoulombs; and an external cell voltage of 1.5 volts indicates an accumulated charge transfer level of approximately 200 milliCoulombs.

Figure 2:
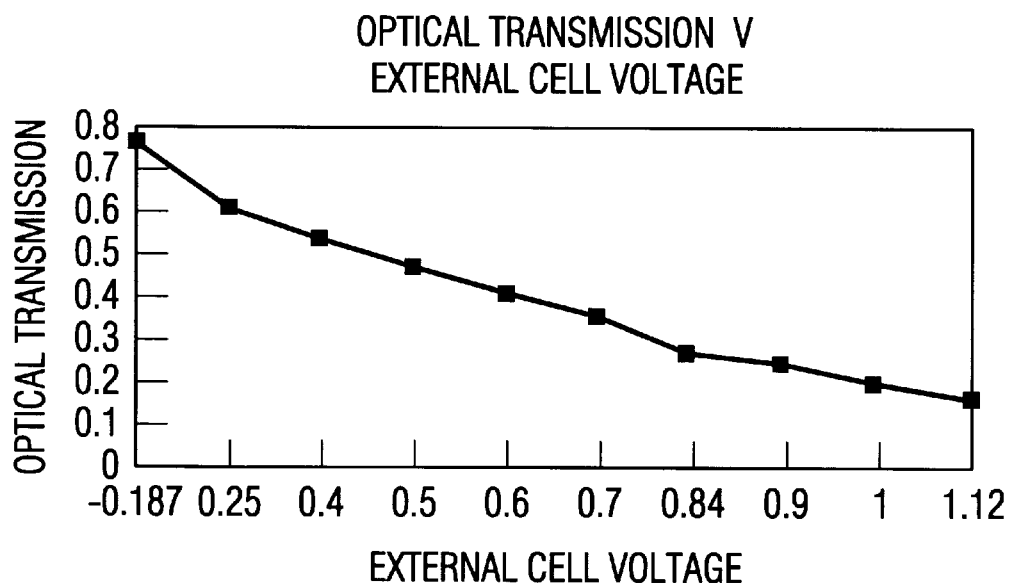
FIG. 2 depicts a graphical representation of electrochromic device optical transmission as a function of electrochromic device voltage under substantially quiescent conditions.

FIG. 2 depicts a graphical representation of electrochromic device optical transmission as a function of electrochromic device voltage under substantially quiescent conditions. Specifically, FIG. 2 shows the non-linear relationship between the external cell voltage and the optical transmission characteristics as measured in per cent. For example, as the external cell voltage increases from a negative 0.187 volts toward positive 1.12 volts, the optical density or optical transmission of the electrochromic cell decreases from approximately 78 per cent to approximately 15 per cent.

Figures 3A, 3B:
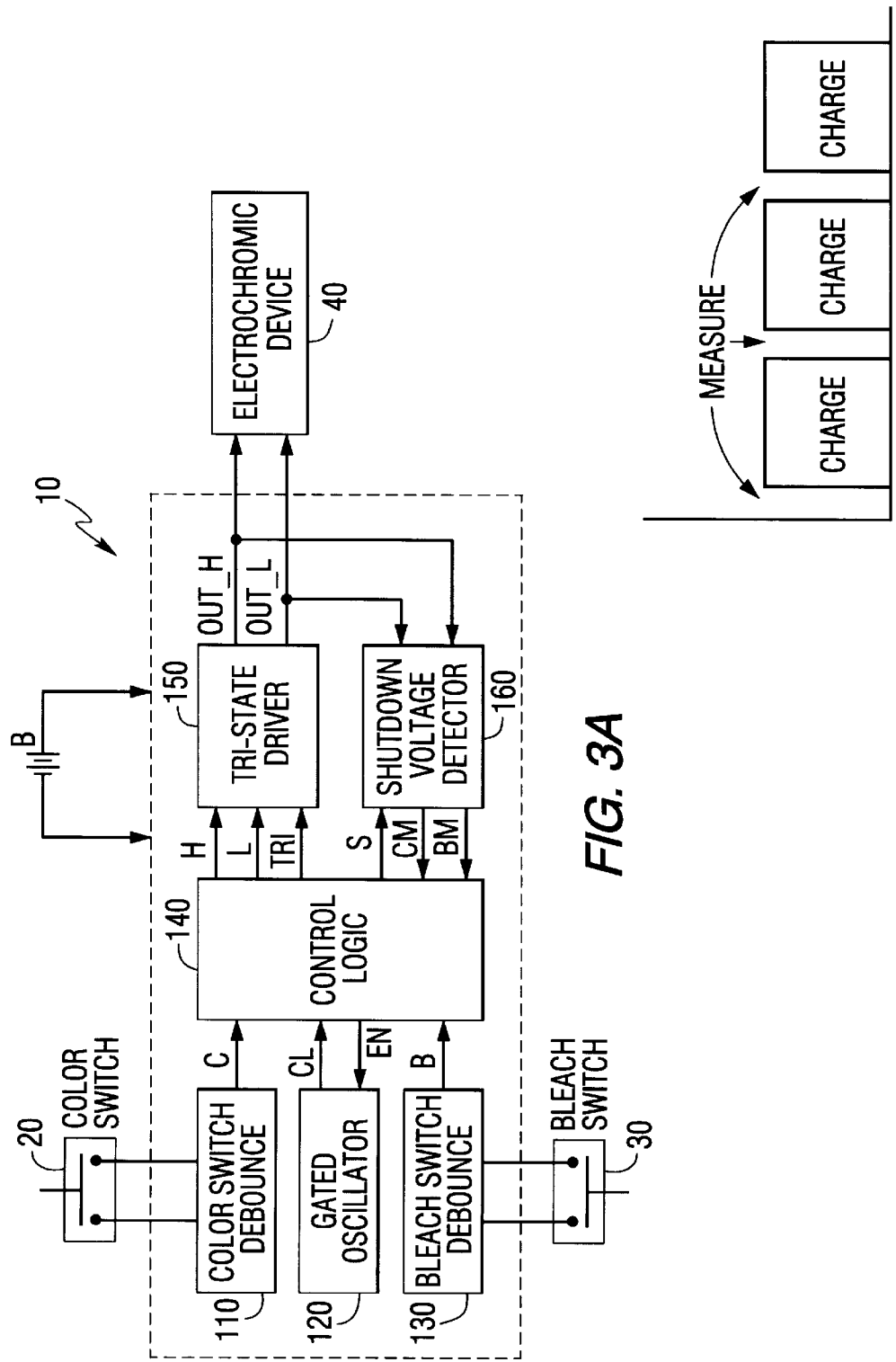
FIG. 3A depicts a high level block of an electrochromic system including electrochromic control apparatus according to the invention.
FIG. 3B depicts a waveform useful in understanding the present invention.

FIG. 3A depicts a high level block of a system including an electrochromic control apparatus 10 according to the invention. Specifically, the electrochromic control apparatus 10 derives power from a battery B and is responsive to a color switch 20 and a bleach switch 30 to modify the oxidation state of an electrochromic device 40, thereby coloring or bleaching the electrochromic device 40. The control methodology of the electrochromic control apparatus 10 will be described in more detail below with respect to FIG. 5.

The electrochromic control apparatus 10 comprises a color switch debouncer 110, a gated oscillator 120, a bleach switch debouncer 130, control logic 140, a tri-state driver 150, and a shut-down voltage detector 160.

Color switch debouncer 110 is coupled to color switch 20 and produces an output signal C indicative of an activation of color switch 20. Similarly, bleach switch debouncer 130 is coupled to bleach switch 30 and produces an output signal B indicative of an activation of bleach switch 30. Color switch debouncer 110 and bleach switch debouncer 130 operate to debounce, respectively, color switch 20 and bleach switch 30. The color switch debouncer 120 output signal C and bleach switch debouncer 130 output signal output signal B are coupled to the control logic 140.

Gated oscillator 120, in response to an enabling control signal EN produced by the control logic 140, produces a clock signal CL that is coupled to the control logic 140. The clock signal CL has a duty cycle that is related to the characteristics of the electrochromic device 40. This is because the clock signal CL is used by the control logic 140 to indicate one of a charge/discharge period (e.g., CL at a logic high level) and a measure period (e.g., CL at a logic low level). FIG. 3B depicts a waveform of the clock signal CL that is illustrative of typical relative durations of a charge period and a discharge period.

During coloration/bleaching, charge is transferred within the device. During the measure period, the voltage across the controlled EC device is measured by the shutdown voltage detector 160. The measure period must be of a duration sufficient to allow the controlled EC device to achieve a relatively quiescent state after charging or discharging.

Control logic 140, in response to color switch activation signal C, bleach switch activation signal B, and clock signal CL responsively produces oscillator enable signal EN, tri-state driver control signals high H, low L, and tri-state enable TRI.

Tri-state driver 150 is responsive to the tri-state enable signal TRI, high control signal H and low control signal L produced by control logic 140. Tri-state driver 150 adapts a first output signal OUT_H and a second output signal OUT_L to one of a first polarity active state, second polarity active state or high impedance state. The first output signal OUT_H and second output signal OUT_L are coupled to electrochromic device 40 and to the shutdown voltage detector 160.

In the high impedance state (e.g., TRI set to a logic low level), the first output signal OUT_H and second output signal OUT_L appear to be disconnected from the electrochromic device 40 (i.e., the respective output terminals of the tri-state driver 150 are internally disconnected).

In the enabled state (e.g., TRI set to a logic high level), the first output signal OUT_H and second output signal OUT_L are controlled in response to the tri-state driver control signals high H and low L. For example, when H is at a logic high level and L is at a logic low level, the tri-state driver 150 adapts the first output signal OUT_H and the second output signal OUT_L to the first polarity active state. Similarly, when H is at a logic low level and L is at a logic high level, the tri-state driver 150 adapts the first output signal OUT_H and second output signal OUT_L to the second polarity active state.

In the first polarity active state, current is sourced from the OUT_H terminal and returned to the OUT_L terminal. In the second polarity active state, current is sourced from the OUT_L terminal and returned to the OUT_H terminal. Thus, assuming a particular connection of the tri-state driver 150 to the electrochromic device 40, the first polarity active state operates to darken the electrochromic device 40, while the second polarity active state operates to bleach the electrochromic device 40. In the high impedance state, the first output signal OUT_H and second output signal OUT_L are effectively floating such that a measurement of the OUT_L and OUT_H terminals will yield a voltage level associated with a device being driven, such as the electrochromic device 40.

Shut-down voltage detector 160 compares the open-circuit voltage of the electrochromic device with a reference voltage and provides output signals which indicate if the maximum bleached BM or maximum colored CM conditions have been reached. The open circuit voltage comprises voltage difference between first output signal OUT_H and second output signal OUT_L during tri-state operation of the tri-state driver 150 (and during a substantially quiescent state of the electrochromic device 40). This voltage is representative of the oxidation state of the electrochromic device 40 and, therefore, is representative of the level of color imparted to the device by the first and/or second polarity active states of the tri-state driver 150.

Figure 5:
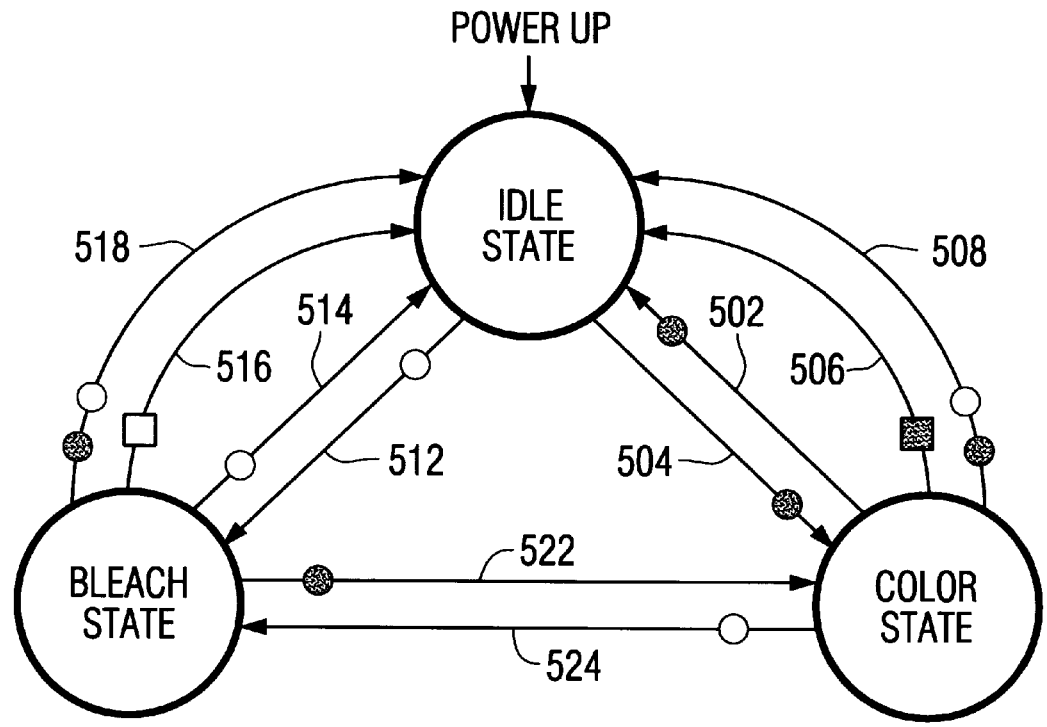
FIG. 5 depicts a state diagram of a binary control methodology suitable for use in the electrochromic control system of FIG. 3A.

FIG. 5 depicts a state diagram of a binary control methodology 500 suitable for use in the electrochromic control apparatus 10 of FIG. 3A. Specifically, FIG. 5 depicts a state diagram of a binary control methodology 500 suitable for implementation as the control logic 140 of the electrochromic control apparatus 10 of FIG. 3A. The binary control methodology 500 utilizes a two-switch (i.e., binary) user interface, such as the color switch 20 and the bleach switch 30 depicted in the system of FIG. 3A. Thus, the binary control methodology 500 allows a user to selectively lighten and darken an electrochromic device (e.g., EC device 40) by a desired amount using only two switches.

The binary control methodology 500, which will now be described in detail, comprises three distinct states, namely, IDLE, COLOR and BLEACH. The IDLE state is entered upon power-up of a system implementing the binary control methodology 500, e.g., upon installation or activation of the battery B in the system of FIG. 3A. In the IDLE state, the system consumes very little current from the battery.

The system remains in the IDLE state until the user activates either the color switch 20 or bleach switch 30. If the color switch is activated 502 while in the IDLE state, the system enters the COLOR state and begins to darken the electrochromic device 40 (i.e., coloring the EC device). If the bleach switch is activated 512 while in the IDLE state, the system enters the BLEACH state and begins to bleach the electrochromic device 40 (i.e., bleaching the EC device).

While in the COLOR state control logic 140, in response to a logical high level of the clock signal CL, enables the tri-state driver (e.g., sets the control signal TRI to a high logic level) and causes the tri-state driver 150 to operate in the first polarity state, thereby providing a charging current to the electrochromic device 40. This is the charge period.

While in the BLEACH state control logic 140, in response to a logical high level of the clock signal CL, enables the tri-state driver and causes the tri-state driver 150 to operate in the second polarity state, thereby bleaching the electrochromic device 40.

While in either the COLOR or BLEACH state, control logic 140, in response to a logical low level of the clock signal CL, disables the tri-state driver (e.g., sets the control signal TRI to a low logic level), thereby allowing the first output signal OUT_H and the second output signal OUT_L to float. While these signals are floating, and after a small settling time, a relatively accurate voltage measurement of the electrochromic device 40 may be made. This relatively accurate voltage measurement is associated with the level of coloration of the electrochromic device 40 as previously described with respect to FIG. 1 and FIG. 2.

The system remains in the COLOR state (i.e., continues coloring the EC device) until the user activates 504 the color switch again, or until the EC device becomes fully colored 506. Either of these conditions returns the system to the IDLE state. The system also returns to the IDLE state if the user activates 508 the color switch and bleach switch at the same time. In the case of the user activating 524 the bleach switch, the system enters the BLEACH state.

The system remains in the BLEACH state (i.e., continues bleaching the EC device) until the user activates 514 the bleach switch again, or until the EC device becomes fully bleached 516. Either of these conditions returns the system to the IDLE state. The system also returns to the IDLE state if the user activates 518 the color switch and bleach switch at the same time. In the case of the user activating 522 the color switch, the system enters the COLOR state.

Figure 4A:
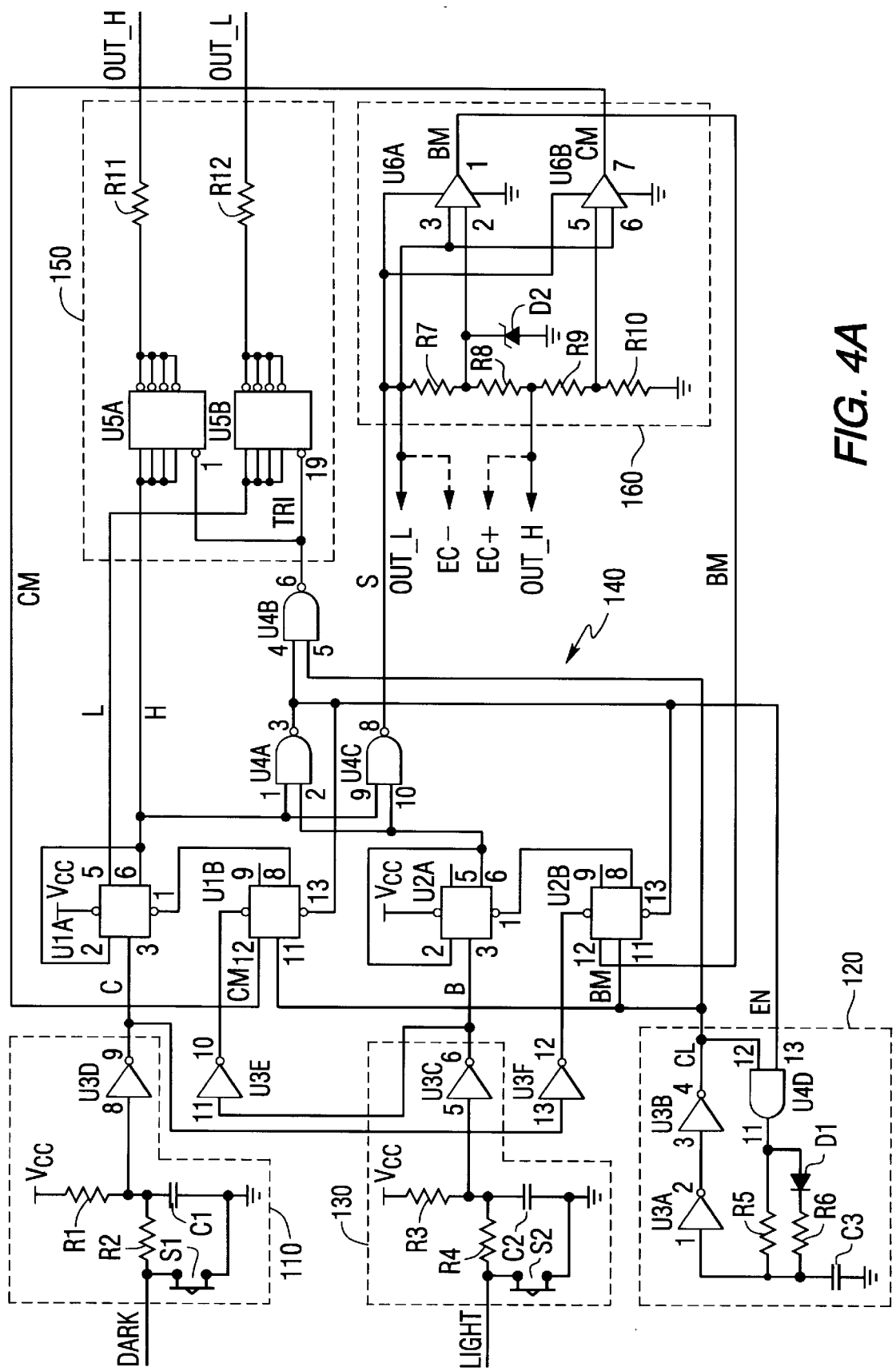
FIG. 4A depicts an embodiment of the electrochromic control apparatus of FIG. 3A.

FIG. 4A depicts an embodiment of the electrochromic control apparatus 10 of FIG. 3A. The electrochromic control apparatus comprises a color switch debouncer 110, a bleach switch debouncer 130, a gated oscillator 120, control logic 140, a tri-state driver 150, and a shut-down voltage detector 160.

Color switch debouncer 110 is coupled to color switch 20 and, in response to activation of color switch 20, produces a switch signal C, indicative of an activation of color switch 20. Similarly, bleach switch debouncer 130 is coupled to bleach switch 30 and produces a signal B indicative of an activation of bleach switch 30.

Color switch debouncer 110 comprises a first resistor R1, a second resistor R2, a capacitor C1 and an inverter U3D. Resistor R1 and capacitor C1 are coupled in series between $V_{CC}$ and ground in the order named. Resistor R2 is coupled between one side of color switch 20 and the junction of R1 and C1. The other side of the color switch 20 is coupled to ground. An input of inverter U3D is coupled to the junction of R1 and C1, while an output of inverter U3D comprises the output of switch debounce circuit 110.

Color switch debouncer 110 operates to debounce color switch 20. In an inactivated state, color switch 20 is open and capacitor C1 charges to +3.6 V ($V_{CC}$) through resistor R1. The output of inverter U3D (terminal U3-8) is initially at a low logic level. When switch S1 is depressed, capacitor C1 is discharged through resistor R2 and the output of terminal U3-D goes high. Inverter U3D comprises, illustratively, an inverter with Schmitt-trigger inputs. The Schmitt-trigger inputs of inverter U3 and the relative time-constants for charging and discharging capacitor C1 form an effective debounce circuit for color switch 20.

Bleach switch debouncer 130 operates in substantially the same manner as color switch debouncer 110. Bleach switch debouncer 130 comprises a first resistor R3, a second resistor R4, a capacitor C2 and an inverter U3C. Bleach switch debouncer 130 operates to debounce bleach switch 30. Components R3, R4, C2 and U3C are connected in the same manner, and perform the same function as, respective components R1, R2, C1 and U3D of color switch debouncer 110.

Gated oscillator 120, in response to an enabling control signal EN produced by control logic 140, produces a clock signal CL that is coupled to control logical 140. As previously discussed, the clock signal CL has a duty cycle that is related to the characteristics of the electrochromic device 40. In the exemplary embodiment of FIG. 4A, the clock signal EC has a frequency of approximately 10 to 20 Hz and a duty cycle of approximately 80 (i.e., logic high for 4 time periods and logic low for one time period).

Gated oscillator 120 comprises a first inverter U3A, a second inverter U3B, an NAND gate U4D, a first resistor R3, a second resistor R6, a diode D1 and a capacitor C3. Capacitor C3 is coupled between ground and input first inverter U3A, resistor R3, and resistor R6. An output of inverter U3A is coupled to input of inverter U3B. An output of inverter U3B is coupled to an input of NAND gate U4D. The side of resistor R6 not coupled to capacitor C3 is coupled to the cathode of diode D1. The anode of diode D1 is coupled to an output of NAND gate U4D and the side of resistor R3 not coupled to capacitor C3. NAND gate U4D has two inputs, one being coupled to the output of inverter U3B and the other being coupled to an enable signal EN produced by control logic 140. The gated output clock signal CL is coupled to control logic 140. Resistors R5 and R6, along with capacitor C3 and diode D1 control the duty-cycle of the oscillator output and, hence, control the ratio of charging period to open-circuit voltage measurement period of the electrochromic device 40.

When the enable signal EN produced by the control logic 140 is at a low logic level, the output of the NAND gate U4D responsively goes (or remains) at a high logic level, thereby gating the oscillator to an off state, i.e., causing the output of the oscillator (at terminal 4 of inverter U3) to stay at a high logic level. In this manner, the control logic 140 may reduce system current consumption during operating modes that do not require production of the clock signal CL, such as during the system IDLE state. When the enable signal EN produced by the control logic 140 is at a high logic level, the output of the NAND gate U4D responsively goes to a logic level that is inverted from the clock signal CL thereby gating the oscillator to an on state, i.e., allowing clocked output of the oscillator. In this manner, the control logic 140 may enable clock signal production only during operating modes requiring such production, such as during the COLOR state and BLEACH state.

When the clock signal CL transitions from a low logic level to a high logic level at U3-4 (i.e., at the end of the measure period), the output of the shutdown voltage detector is sampled. In this manner, the voltage across the electrochromic device 40 is allowed to stabilize for the duration of the measure period and is sampled immediately prior to exiting the measure period.

Tri-state driver 150, in response to the tri-state enable signal TRI produced by control logic 140, adapts a first output signal OUT_H and a second output signal OUT_L to one of a first polarity active state, second polarity active state or high impedance state. Tri-state driver 150 comprises a first driver U5A, a second driver U5B and a pair of current limiting resistors $R_{L1}$ and $R_{L2}$. First driver U5A receives as an input the control signal H produced by control logic 140. Second driver U5B receives as an input the control signal L produced by control logic 140. Both first driver U5A and second driver U5B receive at respective enable inputs the tri-state control signal TRI produced by control logic 140. Resistor $R_{L1}$ is coupled in series with an output of U5A, while resistor $R_{L2}$ is coupled in series with an output of U5B. The output of U5A forms the first output signal OUT_H, while the output of U5B forms the second output signal OUT_L. The first and second output signals OUT_H, OUT_L are used to drive an electrochromic EC device directly, or to drive an electrochromic EC device driver.

The tri-state driver 150 provides either a current limited voltage to the electrochromic device or goes to a high-impedance state so that the open-circuit voltage of the electrochromic device can be measured. Since the drivers U5A and U5B are controlled by complementary control signals L and H, the driver output signals may be used to apply a voltage of either polarity across the electrochromic device 40. In this manner, the circuitry used to charge and discharge the electrochromic device 40 may be driven from a single battery. A high logic level on enable terminals (U5-1 and U5-19) puts the tri-state driver 150 (i.e., drivers U5A and U5B) in a high impedance state. A low logic level on the enable terminals (U5-1 and U5-19) puts the tri-state driver 150 (i.e., drivers U5A and U5B) in an active state, allowing the driver control signals L and H to control the output of the tri-state driver, thereby applying a voltage to the electrochromic device 40.

Shut-down voltage detector 160 compares the open-circuit voltage of the electrochromic device with a reference voltage and provides output signals which indicate if the maximum bleached BM or maximum colored CM conditions have been reached. Shutdown voltage detector 160 comprises a first comparator U6A, a second comparator U6B, four resistors R7–R10 and a voltage reference, illustratively a Zener diode D2. Resistors R7, R8, R9 and R10 are coupled in series in the order named between a control signal S produced by control logic 140 and ground. Zener diode D2 has a cathode coupled to the junction of resistors R7 and R8, and an anode coupled to ground. The cathode of Zener diode D2 is also coupled to an inverting input of first comparator U6A. First comparator U6A and second comparator U6B each have respective $V_{DD}$ and ground terminals. The $V_{DD}$ terminals are coupled to control signal S produced by control logic 140, while the ground terminals are coupled to ground.

The low output signal OUT_L produced by tri-state driver 150 is coupled to a non-inverting input of first comparator U6A, and an inverting input of second comparator U6B. The high output line of tri-state driver 150 is coupled to the junction of resistors R8 and R9. A non-inverting input of the second comparator U6B is coupled to the junction of resistors R9 and R10. First comparator U6A produces at an output a signal BM indicative of a maximal bleach state of an electrochromic device being monitored. Similarly, second comparator U6B produces at an output a signal CM indicative of a maximum state of coloration of an electrochromic device EC being monitored. In the preferred embodiment, resistor R7 is a 10K ohm resistor, resistor R8 and R10 are 100K ohm resistors, resistor R9 is a 220K ohm resistor, Zener diode D2 is a 2.5 volt band gap reference diode, and comparators U6A and U6B are standard comparators. The maximum coloration indicative signal CM and the maximal bleach indicative signal BM are coupled to the control logic 140.

In one embodiment of the invention, instead of the output signals OUT_L and OUT_H from the tri-state driver 150, a negative and positive electrochromic sense signals EC– and EC+ are coupled to, respectively, the non-inverting input of U5A, and the inverting input of U5B. The sense points are utilized when the output signals OUT_L and OUT_H from the tri-state driver 150 are not used to directly drive an electrochromic device, e.g., when the output signals OUT_L and OUT_H are used to drive a device driver such as the driver described below with respect to FIG. 7.

The shutdown voltage detector 160 compares the open-circuit voltage of the electrochromic device with a reference voltage and provides output signals which indicate if the maximum bleached or maximum colored conditions have been reached. The shutdown voltage detector 160 is powered from the output of NAND gate U4C. In the IDLE state the output of NAND gate U4C is at a low logic level, thereby preventing operation of the shutdown voltage detector to, e.g., reduce current consumption. In the COLOR or BLEACH state the output of NAND gate U4C is at a high logic level (e.g.,+3.6 V), thereby enabling operation of the shutdown voltage detector.

When operating, voltage regulator D2 provides a stable +2.5 volt reference relatively independent of battery voltage. This provides stable optical transmission endpoints for the control system. The voltage across R8 defines the BLEACH state shutdown voltage limit and is nominally 0.6 volts. The voltage across R9 defines the COLOR state shutdown voltage limit and is nominally 1.3 volts. These shutdown voltage limits can be modified by changing the values of R8–R10. Voltage comparator U6A senses the BLEACH state limit. At the low-to-high transition of the oscillator output (U3-4), a high logic level at U6-1 indicates the shutdown limit has been reached; a low logic level indicates the limit has not been reached. Similarly, voltage comparator U6B senses the COLOR state limit, and the output at U6-7 indicates if the color limit has been reached.

The control logic 140 comprises a sequential-logic circuit that implements the state diagram 500 described below with respect to FIG. 5. In addition, the control logic 140 gates the oscillator on or off and controls power to the shutdown voltage detector circuit 160. Control logic 140 comprises four sequential logic elements, illustratively four D-type flip flops U1A, U1B, U2A and U2B, three NAND gates U4A, U4B, U4C and two inverters U3E and U3F. Each D-type flip flop operates in a known manner and comprises a clock input CLK, a data input D, a preset input PR, a clear input CL, a non-inverted data output Q and an inverted data output Q-NOT.

Referring now to first D-type flip flop U1A, data input D is coupled to inverted data output Q-NOT, preset input PR is coupled to $V_{CC}$, clock input CLK is coupled to debounced color switch signal C and clear input CL is coupled to the inverted data output of second D-type flip flop U1B. The non-inverting data output of first D-type flip flop U1A is the source of the control signal L that is coupled to tri-state driver 150. Similarly, the inverting data output Q-NOT of U1A is a source of the H control signal that is coupled to the tri-state driver 150.

Referring now to second D-type flip flop U1B, data input D is coupled to the maximal coloration indicative signal CM produced by shut-down voltage detector 160, clock input CLK is coupled to the output signal CL produced by gated oscillator 120, inverting data output Q-NOT is coupled to the clear input CL of first D-type flip flop U1A, non-inverting data output signal Q is not connected, and preset input PR is coupled to the output of first inverter U3E. The input of first inverter U3E is coupled to the output of switch debounce circuit 130. I.e., the input of first inverter U3E is coupled to the bleach indicative switching signal B.

Referring now to third D-type flip flop U2A, data input D is coupled to inverting data output Q-NOT, preset input PR is coupled to VCC, clock input CLK is coupled to the bleaching indicative output signal B of debounce circuit 130, clear input signal CL is coupled to the inverted data output signal Q-NOT of fourth D-type flip flop U2B and the non-inverted data output signal Q of U2A is left unconnected.

The inverted data output of first D-type flip flop U1A is connected to an input of first NAND gate U4A and third NAND gate U4C. The inverted data output of third D-type flip flop U2A is coupled to a second input of first NAND gate U4A and third NAND gate U4C. The output of first NAND gate U4A is coupled to an input of second NAND gate U4B, the data clear input CL of second D-type flip flop U1B, the data clear input CL of fourth D-type flip-flop U2B, and the enable input EN of gated oscillator 120. The output of third NAND gate U4C is coupled to shutdown voltage detector 160 as the control signal S. The second input of second NAND gate U4B is coupled to the clock output of gated oscillator 120. The output of second NAND gate U4B is coupled to tri-state driver 150 as tri-state control signal TRI. The control logic consists of U1A, U1B, U2A, U2B, U3E, U3F, U4A, U4B and U4C. During power on, capacitors C1 and C2 are initially discharged and force the outputs of both U3E and U3F to low logic levels. Flip-flops U1B and U2B are then preset causing U1-8 and U2-8 to go low, which in turn clear flip-flops U1A and U2A. U1-5 and U2-5 are low, U1-6 and U2-6 are high. NAND gate outputs U4-3 and U4-8 are at a low logic level and U4-6 at a high level. Capacitors C1 and C2 charge through resistors R1 and R3 respectively, and the outputs of U3E and U3F go high. This power-on reset sequence takes about 250 ms. After the power-on sequence is complete, the circuit is in the IDLE state and ready for use.

Momentarily pressing the COLOR push-button S1, causes a high-going pulse at U1-3 which in turn causes U1-5 to go high and U1-6 to go low. U4-3 and U4-8 both go high. U4-6 goes low and the tri-state drivers (U5A and U5B) are enabled. U5A's outputs all go high and U5B's outputs all go low. The circuit has entered the COLOR state, and the electrochromic device begins to color. The oscillator also begins to oscillate. Initially, U3-4 is high. However, the waveform of U3-4 begins to follow the waveform shown in FIG. 3B. The tri-state drivers are enabled when U3-4 is high and disabled when U3-4 is low. At the rising edge of U3-4 (low-to-high transition), the outputs of the shutdown voltage detectors are sampled. The circuit will alternate between charging and measuring modes until either the color limit is reached or the user presses the COLOR push-button again. Assume that the user does not press any push-button. Then when the color limit is reached, U6-7 will be high when sampled. This high logic level is clocked into flip-flop U1B causing U1-8 to go low. This is turn clears U1A and U1-5 returns low, U1-6 returns high. The tri-state driver (U5A and U5B) are disabled, the oscillator is gated off, and power to the shutdown voltage detector circuit is removed. The circuit is now back in the low-power IDLE state. Now assume that the user does press the COLOR push-button again before the color limit is reached. The output state of flip-flop U1 will toggle and the circuit will return to the IDLE state. The control logic is a symmetrical circuit. One part controls coloring, the other part controls bleaching. The portion described above controls the coloring cycle. The bleaching cycle is identical to the coloring cycle except the alternate half of the control logic is performing the operation.

In addition to the bleaching and coloring operations adescribed above, the control logic also prevents bleaching and coloring at the same time. To understand this function, assume that the control logic is in the middle of a coloring cycle (U1-5 is high). Now assume that the user presses the BLEACH push-button. This causes U3-6 to go high, and flip-flop U2A toggles (U2-5 goes high, U2-6 goes low). Also at the same time, U3-10 goes low causing flip-flop U1B to be preset. U1-8 goes low and clears U1A. U1-5 goes low, U1-6 goes high and the circuit is now in the BLEACH state. A similar operation occurs if the system is in a bleaching cycle and the user presses the COLOR push-button. If the user presses both the BLEACH and COLOR push-buttons at the same time, then both U1B and U2B will be preset. This causes both U1A and U2A to be cleared, and the system is returned to the IDLE state.

The invention described above is applicable to a wide range of areas where optical density control is required, such as dimming control of sunglasses or architectural, automotive and aeronautical glazings. In the case of dimming control applications requiring large amounts of power (unlike a sunglasses application), the electrochromic control apparatus 10 of FIG. 3A may be modified to perform a power driver function.

Figure 4B:
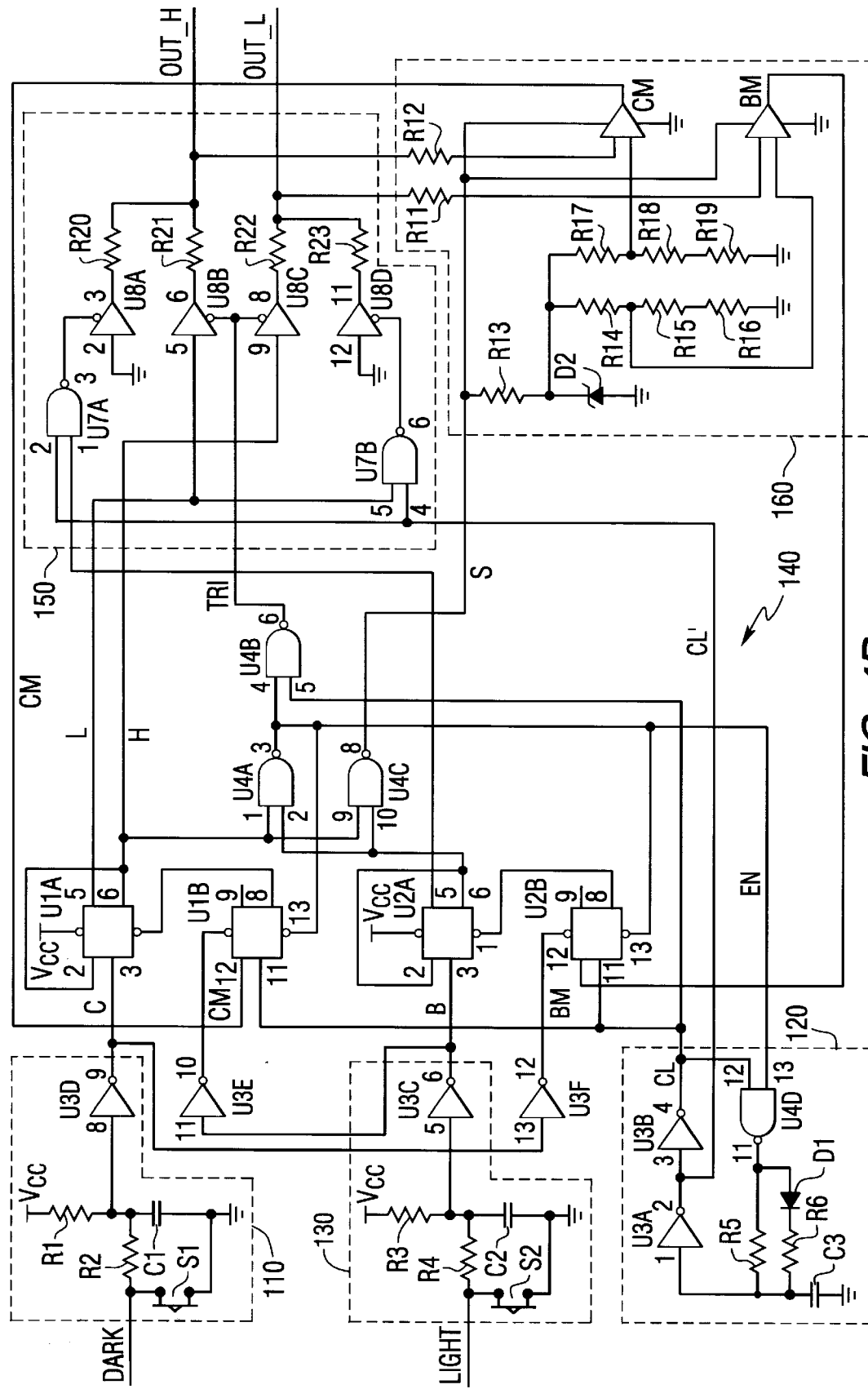
FIG. 4B depicts an alternate embodiment of the electrochromic control apparatus of FIG. 3A.

FIG. 4B depicts an embodiment of the electrochromic control apparatus 10 of FIG. 3A. Specifically, the electrochromic control apparatus of FIG. 4B comprises a color switch debouncer 110, a bleach switch debouncer 130, a gated oscillator 120, control logic 140, a tri-state driver 150, and a shut down voltage detector 160.

The electrochromic control apparatus depicted in FIG. 4B differs from the electrochromic control apparatus depicted in FIG. 4A primarily in two respects, namely, the tri-state driver 150 and the shut down voltage detector 160. Thus, since the color switch debouncer 110, bleach switch debouncer 130, gated oscillator 120 and control logic 140 of the embodiment of FIG. 4B operate in substantially the same manner as previously described with respect to FIG. 4A, only the tri-state driver 150 and voltage detector 160 will be described in more detail below.

Tri-state driver 150 of FIG. 4B, in response to the tri-state enable signal TRI produced by control logic 140, adapts a first output signal OUT_H and a second output signal OUT_L to one of a first plurality active state, second plurality active state or high impedance state. Tri-state driver 150 of FIG. 4B comprises a pair of NAND gates, U7A and U7B, four tri-state enabled, non-inverting buffers U8A, U8B, U8C and U8D, and four resistors R20, R21, R22 and R23.

Each of first non-inverting buffer U8A and fourth non-inverting buffer U8D have an input coupled to ground. The control signal L produced by control logic 140 is coupled to both an input of second non-inverting buffer U8B, and a first input of second NAND gate U7B. The control signal H is coupled to an input of third non-inverting buffer U8C. The tri-state driver signal TRI is coupled to a tri-state control input of both the second non-inverting buffer U8B and the third non-inverting buffer U8C. The control signals L, H and TRI are described in more detail above with respect to FIG. 4A.

As previously described, gated oscillator 120 comprises a second inverter U3B and other components. Gated oscillator 120 produces a clock signal CL which is present at the output terminal of the second inverter U3B. In the embodiment of FIG. 4B, an inverted clock signal CL' (i.e., a clock signal 180 degrees out of phase with CL) is utilized. The inverted clock signal CL' is the signal present at the input of the second inverter U3B of gated oscillator 120. The inverted clock signal CL' is coupled to both a first input terminal of first NAND gate U7A, and a second input terminal of second NAND gate U7B.

A second input of first NAND gate U7A is coupled to the non-inverting data output Q of third D-type flip flop U2A of control logic 140. An output signal from the first NAND gate U7A is coupled to a tri-state control input of first non-inverting buffer U8A. An output signal of second NAND gate U7B is coupled to a tri-state control input of fourth non-inverting buffer U8D. First resistor R20 is coupled between an output of first non-inverting buffer U8A and the OUT_H signal terminal. Second resistor R21 is coupled between an output terminal of second non-inverting buffer U8B and the OUT_H signal terminal. Third resistor R22 is coupled between an output terminal of third non-inverting buffer U8C and the OUT_L signal terminal. Fourth resistor R23 is coupled between an output terminal of fourth non-inverting buffer U8D and the OUT_L signal terminal.

In the high impedance state (e.g., TRI set to a logic high level), the first output signal OUT_H and second output signal OUT_L appear to be disconnected from the electrochromic device 40.

In the enabled state (e.g., TRI set to a logic low level), the first output signal OUT_H and second output signal OUT_L are controlled in response to the tri-state driver control signals high H and low L. For example, when L is at a logic high level and H is at a logic low level, the tri-state driver 150 adapts the first output signal OUT_H and the second output signal OUT_L to the first polarity active state. Similarly, when L is at a logic low level and H is at a logic high level, the tri-state driver 150 adapts the first output signal OUT_H and second output signal OUT_L to the second polarity active state.

In the first polarity active state, current is sourced from the OUT_H terminal and returned to the OUT_L terminal. In the second polarity active state, current is sourced from the OUT_L terminal and returned to the OUT_H terminal. Thus, assuming a particular connection of the tri-state driver 150 to the electrochromic device 40, the first polarity active state operates to charge the electrochromic device 40, while the second polarity active state operates to discharge the electrochromic device 40. In the high impedance state, the first output signal OUT_H and second output signal OUT_L are effectively floating such that a measurement of the OUT_L and OUT_H terminals will yield a voltage level associated with a device being driven, such as the electrochromic device 40.

Shut-down voltage detector 160 compares the open circuit voltage of the electrochromic device EC with a reference voltage and provides output signals which indicate if the maximum bleached BM or maximum colored CM conditions have been reached. Shut-down voltage detector 160 of FIG. 4B comprises a first comparator U6A, a second comparator U6B, nine resistors R11 through R19 and a voltage reference, illustratively, a Zener diode D2.

Resistor R13 is coupled between the control signal S produced by control logic 140 and a cathode of diode D2. The anode of diode D2 is coupled to ground. Resistor R14, resistor R15, and a resistor R16 are coupled in series in the order named between the cathode of diode D2 and ground. Resistor R17, resistor R18 and resistor R19 are coupled in series in the order named between the cathode of diode D2 and ground.

First comparator U6A and second comparator U6B each have respective $V_{DD}$ and ground terminals. The $V_{DD}$ terminals are coupled to the control signal S produced by control logic 140, while the ground terminals are coupled to ground. An inverting input of first comparator U6A is coupled to the junction of resistors R17 and R18. A non-inverting input of second comparator U6B is coupled to the junction of resistors R14 and R15. Resistor R12 is coupled between a non-inverting input of first comparator U6A and the OUT_H signal terminal. Resistor R11 is coupled between a non-inverting input of second comparator U6B and the OUT_L signal terminal.

Table 1 depicts exemplary values for the components used in the embodiments of FIG. 4A and FIG. 4B. It will be recognized by those skilled in the art, and informed by the teachings of the present invention, that modifications and substitutions may be made to the components identified in Table 1, while adhering to the invention.

TABLE 1

| COMPONENT | VALUE |
|---|---|
| R1 | 1.0M |
| R2 | 1.0K |
| R3 | 1.0M |
| R4 | 1.0K |
| R5 | 10M |
| R6 | 1.0M |
| R7 | 10K |
| R8 | 80K |
| R9 | 200K |
| R10 | 51.1K |
| $R_{L1}$-$R_{L2}$ | 47 ohms |
| R11, R12, R13 | 10K |
| R14 | 374K |
| R15 | 88.7K |
| R16 | 50K |
| R17 | 88.7K |
| R18 | 88.7K |
| R19 | 50K |
| R20 | 1.0K |
| R21 | 43 ohm |
| R22 | 43 ohm |
| R23 | 1.0K |
| C1 | 0.1 uF |
| C2 | 0.1 uF |
| C3 | 0.01 uF |
| D1 | 1N914 signal diode |
| D2 | LM285 BY-2.5 reference diode |
| U1A–U1B | 74HC74 D-type flip flop |
| U2A–U2B | 74HC74 D-type flip flop |
| U3A–U3F | 74HC14 inverters |
| U4A–U4D | 74HC00 NAND gates |
| U5A–U5B | 74HC240 tri-state drivers |
| U6A–U6B | TLC3702C comparators |
| U7A–U7B | 74HC00 NAND gates |
| U8A–U8D | 74HC125 non-inverting buffers |

Figure 6:
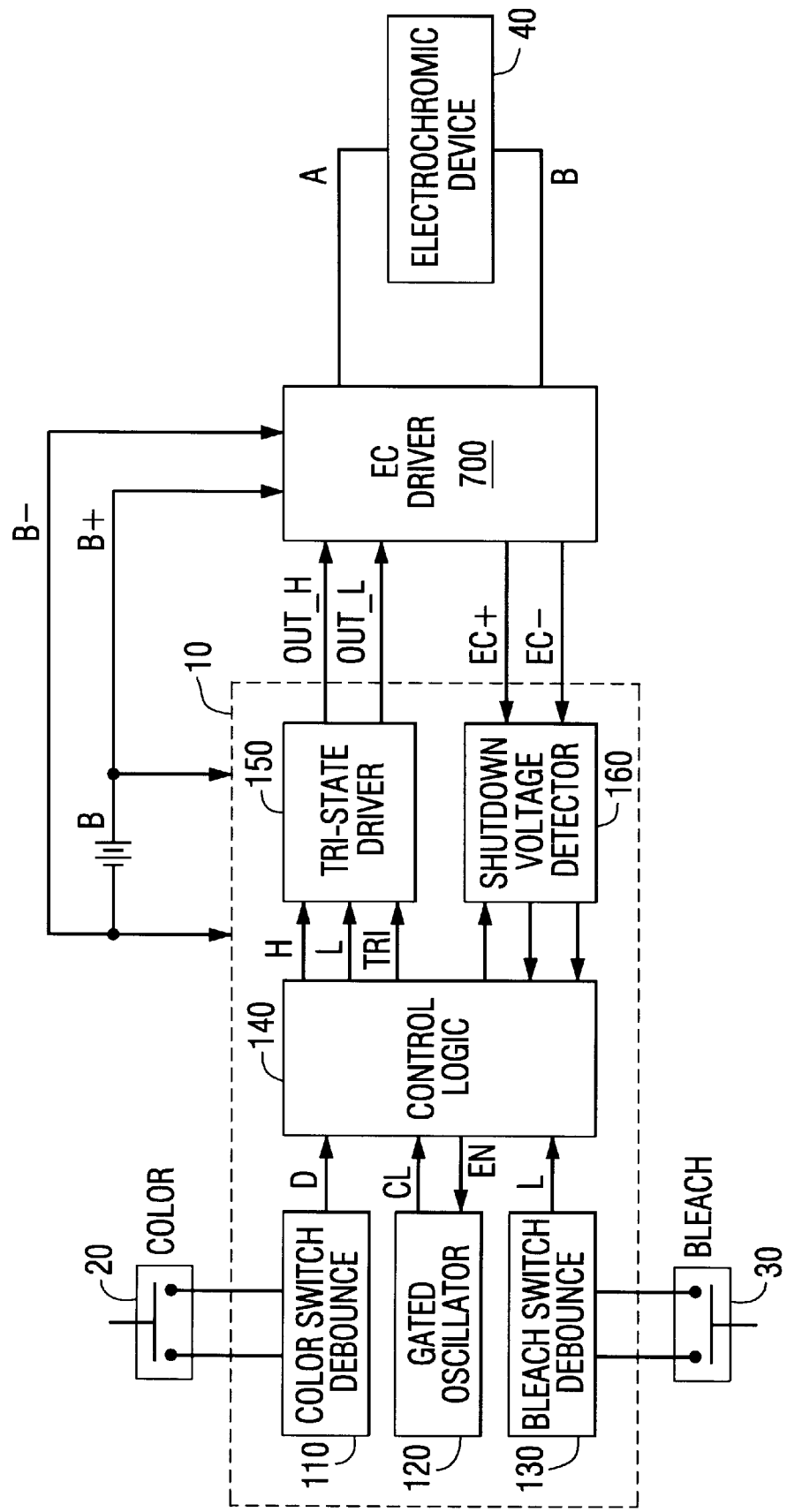
FIG. 6 depicts a high level block diagram of an electrochromic control system suitable for controlling a relatively high power electrochromic driver and including electrochromic control apparatus according to the invention.

FIG. 6 depicts a high level block diagram of an electrochromic control system 10 suitable for controlling a relatively high power electrochromic driver 700 and including electrochromic control apparatus according to the invention. Since the electrochromic control system 10 of FIG. 6 operates in substantially the same manner as the electrochromic control system 10 of FIG. 3A, only differences between the two figures will be described in detail. Specifically, the color switch debouncer 110, gated oscillator 120, bleach switch debouncer 130, control logic 140, tri-state driver 150, and a shut-down voltage detector 160 operate in substantially the same manner in both figures.

Unlike the electrochromic control system 10 of FIG. 3A, the electrochromic control system 10 of FIG. 6 does not directly drive the electrochromic device 40. Rather, the first output signal OUT_H and second output signal OUT_L of the tri-state driver 150 are coupled to drive inputs of a relatively high power electrochromic (EC) driver circuit 700, which will be described in more detail below with respect to FIG. 7. Additionally, the voltage shutdown detector 160 does not utilize the first output signal OUT_H and second output signal OUT_L to determine the voltage across the electrochromic device 40. Rather, positive EC+ and negative EC– electrochromic device 40 voltage sensing lines are brought out from the electrochromic (EC) driver circuit 700.

FIG. 7 is a schematic diagram of a relatively high power electrochromic (EC) driver circuit suitable for use with the electrochromic control system of FIG. 6. The EC driver circuit 700 comprises four switching devices SWA-SWD, illustratively metal oxide semiconductor field effect transistors (MOSFETs) arranged in an H-bridge configuration. The first SWA and fourth SWD switches are responsive to the first output signal OUT_H of the tri-state driver 150, while the second SWB and third SWC switches are responsive to the second output signal OUT_L of the tri-state driver 150, as shown below in Table 2.

TABLE 2

| OUT_L | OUT_H | Mode |
|---|---|---|
| 0 | 1 | Color |
| 1 | 0 | Bleach |
| 0 | 0 | Measure |
| 1 | 1 | Not Allowed |
| High-Z | High-Z | Measure |

In a Color mode of operation, the first output signal OUT_H is set to a logical high state and the second output signal OUT_L is set to a logical low state. In the color mode of operation, the first SWA and fourth SWD switches are closed while the second SWB and third SWC switches are open. Thus, a current $I_C$ flows through the electrochromic device 40 from a terminal A to a terminal B, increasing the charge level (and darkening) the electrochromic device 40.

In a Bleach mode of operation, the first output signal OUT_H is set to a logical low state and the second output signal OUT_L is set to a logical high state. In the bleach mode of operation, the first SWA and fourth SWD switches are open while the second SWB and third SWC switches are closed. Thus, a current $I_B$ flows through the electrochromic device 40 from the terminal B to the terminal A, decreasing the charge level (and lightening) the electrochromic device 40.

In a measure mode of operation, the first output signal OUT_H and second output signal OUT_L of the tri-state driver 150 are both in a logical low state or in a high impedance (i.e., High-Z) state. Thus, all the switches are open such that the electrochromic device 40 is neither charged or discharged, except for a very small discharge related to, e.g., transistor leakage currents. During the measure mode of operation, the voltage across the electrochromic device 40 may be measured via the voltage sensing lines EC+ and EC–.

In the exemplary embodiment of FIG. 7, the first output signal OUT_H and second output signal OUT_L of the tri-state driver 150 must never be set to a logical high state at the same time since doing so will short the positive and negative battery terminals together.

FIG. 8 depicts an embodiment of an EC controller 800 according to the invention and suitable for use in the electrochromic control apparatus of FIG. 3A and FIG. 6. Specifically, FIG. 8 depicts an EC controller 800 (i.e., microcomputer or microprocessor) that implements the functionality of control logic 140. It will be known to those skilled in the art that the functionality of color switch debouncer 110, bleach switch debouncer 130, tri-state driver 150 and shutdown voltage detector 160 of FIG. 3A and FIG. 6. may also be incorporated into the EC controller 800 of FIG. 8.

The EC controller 800 comprises a microprocessor 820 as well as memory 830 for storing an EC control routine 500 implementing the state diagram 500 of FIG. 5. The microprocessor 820 cooperates with conventional support circuitry 840 such as power supplies, clock circuits (e.g., gated oscillator 120), cache memory and the like as well as circuits that assist in executing the software routines. As such, it is contemplated that some of the process steps discussed herein as software processes may be implemented within hardware, e.g., as circuitry that cooperates with the microprocessor 820 to perform various steps.

The EC controller 800 also contains input/output circuitry 810 that forms an interface between the EC controller 800 and the color switch debouncer 110, bleach switch debouncer 130, tri-state driver 150 and shutdown voltage detector 160 bleach switch of FIG. 3A or FIG. 6. Specifically, the I/O circuit 810 receives the bleach switch indicative signal B, the color switch indicative signal C, the maximum bleach level indicative signal BM and the maximum colored level indicative signal CM. In response, the microprocessor 820 logically operates in the manner described above with respect to the control logic 140 to produce, at respective outputs of the I/O circuit 810, the low and high tri-state driver control signals L and H, the tri-state enable signal TRI and the shutdown voltage detector 160 enable signal S.

Although the EC controller 800 is depicted as a general purpose computer that is programmed to perform EC control functions in accordance with the present invention, the invention can be implemented in hardware as an application specific integrated circuit (ASIC). As such, the process steps described herein are intended to be broadly interpreted as being equivalently performed by software, hardware, or a combination thereof.

The above-described embodiments of the invention provide an attractive and scaleable control apparatus and methodology suitable for use in a variety of EC applications. For example, to accommodate the control of large EC films for automotive and large display applications, the battery B may be replaced by a DC power source (or solar array), the relatively high power electrochromic driver 700 of FIG. 7 may utilize high power transistors or other high power DC/DC converter topologies.

In one embodiment of the invention, the battery B is replaced by a solar cell configuration that is formed in conjunction with an EC film, thereby providing a self powered dimming glazing for use in, e.g., automotive and other applications.

In another embodiment of the invention, a programmable EC display comprising a plurality of EC elements arranged in a matrix is controlled by the invention. In this embodiment, a switching matrix controllably couples the invention to each element such that each element may be maintained at a particular gray-scale level, thereby forming an image on, e.g., a billboard In this embodiment, the switching matrix causes each element to be refreshed within a predetermined time period determined by the impedance of the element.

The above-described invention is particularly well suited for battery powered electrochromic device applications, such for controlling the charge level of electrochromic coatings on lenses in, e.g., a pair of eyeglasses (i.e., sunglasses). The invention also finds applicability in areas such as automotive, architectural and aircraft glass and/or glazing, advertising displays and the like.

Although various embodiments which incorporate the teachings of the present invention have been shown and described in detail herein, those skilled in the art can readily devise many other varied embodiments that still incorporate these teachings.

What is claimed is:

1. Apparatus for controlling a charge state of an electrochromic device, comprising:
    a driver, coupled to said electrochromic device, for selectively imparting one of a positive charge and a negative charge to said electrochromic device in response to a charge control signal;
    a detector, coupled to said electrochromic device, for measuring a voltage level of said electrochromic device and responsively producing charge-indicative output signal; and
    a controller, coupled to said driver and said detector, for adapting a charge level of said electrochromic device in response to an input control signal;
    said controller, in a first operating mode, causing said driver to impart charge to said electrochromic device during a first period of time, and to stop imparting charge for during a second period of time, said controller entering said first operating mode in response to said input signal being indicative of said electrochromic device having an insufficient charge level, said controller exiting said first operating mode in response to either said input signal being indicative of said electrochromic device having an appropriate charge level or said charge-indicative output signal from said detector indicating that said electrochromic device has achieved a maximal charge level; and
    said controller, in a second operating mode, causing said driver to remove charge from said electrochromic device during said first period of time, and to stop removing charge during said second period of time, said controller entering said second operating mode in response to said input signal being indicative of said electrochromic device having an excessive charge level, said controller exiting said second operating mode in response to either said input signal being indicative of said electrochromic device having an appropriate charge level or said charge-indicative output signal from said detector indicating that said electrochromic device has achieved a minimal charge level.

2. The apparatus of claim 1, wherein said second period of time is selected to be at least long enough to allow said electrochromic device to achieve a relatively quiescent state subsequent to a charging or discharging cycle.

3. The apparatus of claim 2, wherein:
    said driver comprises a tri-state driver conditioned to operate in a high impedance mode during said second period of time; and
    said detector is conditioned to measure said electrochromic device during said second period of time.

4. The apparatus of claim 3, wherein said detector is coupled to the output of said tri-state driver.

5. The apparatus of claim 1, wherein said input control signal comprises a charge signal and a discharge signal, said controller entering said first mode of operation in response to said charge signal, and entering said second mode of operation in response to said discharge signal.

6. The apparatus of claim 1, wherein:
    said driver comprises a plurality of switching devices arranged in a bridge configuration;
    said driver imparting charge to said electrochromic device by providing a first current to said electrochromic device; and
    said driver removing charge from said electrochromic device by providing a second current to said electrochromic device, said first and second currents having opposite polarities.

7. The apparatus of claim 1, wherein said apparatus comprises a portion of a pair of eyeglasses, and wherein said electrochromic device comprises a lens portion of said eyeglasses.

8. Apparatus for controlling a charge state of an electrochromic device, comprising:

a driver for imparting charge to said electrochromic device;

a controller, for adapting said driver in response to a first control signal and a second control signal; and a comparator, for comparing a voltage level of said electrochromic device to an upper threshold level and producing therefrom an upper threshold indicative output signal, and for comparing said voltage level of said electrochromic device to a lower threshold level and producing therefrom a lower threshold indicative output signal;

said controller, in response to an assertion of only said first control signal, entering a charge mode of operation, wherein said controller causes said driver to impart charge to said electrochromic device;

said controller, in response to an assertion of only said second control signal, entering a discharge mode of operation, wherein said controller causes said driver to remove charge from said electrochromic device; and said controller, in response to an assertion of said first and second control signals, entering an idle mode of operation, wherein said controller causes said driver to stop modifying said charge of said electrochromic device.

9. The apparatus of claim 8, wherein:

said controller, in said charge mode of operation, entering said idle mode of operation in response to an indication of said voltage level of said electrochromic device reaching said upper threshold level.

10. The apparatus of claim 8, wherein:

said controller, in said discharge mode of operation, entering said idle mode of operation in response to an indication of said voltage level of said electrochromic device reaching said lower threshold level.

11. The apparatus of claim 8, wherein said driver comprises:

a first tri-state driver, for sourcing current in a first enabled mode of operation and for sinking current in a second enabled mode of operation; and a second tri-state driver, for sinking current in said first enabled mode of operation and for source current in said second enabled mode of operation;

said first and second tri-state drivers being enabled by a tri-state enable signal produced by said controller;

said first and second tri-state drivers being adapted to said first enabled mode of operation in response to a first control signal polarity, and being adapted to said second enabled mode of operation in response to a second control signal polarity.

12. The apparatus of claim 8, wherein:

said driver periodically enters a high impedance output state in response to a clock signal; and said lower threshold indicative output signal and said upper threshold indicative output signal produced by said comparator are valid during a portion of the time said driver is within said high impedance state.

13. The apparatus of claim 12, wherein:

said controller is responsive to said comparator output signals during a transition of said first clock signal indicative of a termination of said high impedance output state of said driver.

14. The apparatus of claim 12, wherein said portion of time begins after a period of time sufficient to allow said electrochromic device to achieve a relatively quiescent state subsequent to a charging or discharging cycle.

15. The apparatus of claim 8, wherein:

said driver comprises a plurlity of switching devices arranged in a bridge configuration;

said driver imparting charge to said electrochromic device by providing a first current to said electrochromic device; and said driver removing charge from said electrochromic device by providing a second current to said electrochromic device, said first and second currents having opposite polarities.

16. The apparatus of claim 8, wherein:

said first and sect control signals are produced by respective first and second switches.

17. The apparatus of claim 8, wherein said apparatus comprises a portion of a pair of eyeglasses, and wherein said electrochromic device comprises a lens portion of said eyeglasses.

18. The apparatus of claim 16, wherein said apparatus comprises a portion of a pair of eyeglasses, and wherein said electrochromic device comprises a lens portion of said eyeglasses.

19. In a system for controlling a charge state of an electrochromic device, said system a driver for imparting charge to said electrochromic device, a controller, for adapting said driver in response to a first control signal and a second control signal; and a comparator, for comparing a voltage level of said electrochromic device to an upper threshold level and producing therefrom an upper threshold indicative output signal, and for comparing said voltage level of said electrochromic device to a lower threshold level and producing therefrom a lower threshold indicative output signal, a method for comprising the steps of:

entering, in response to an assertion of only said first control signal, a charge mode of operation, wherein said controller causes said driver to impart charge to said electrochromic device;

entering, in response to an assertion of only said second control signal, a discharge mode of operation, wherein said controller causes said driver to remove charge from said electrochromic device; and entering, in response to an assertion of said first and second control signals, an idle mode of operation, wherein said controller causes said driver to stop modifying said charge of said electrochromic device.

20. The method of claim 19, further comprising the step of:

entering said idle mode of operation from said charge mode of operation in response to an indication of said voltage level of said electrochromic device reaching said upper threshold level; and entering said idle mode of operation from said discharge mode of operation in response to an indication of said voltage level of said electrochromic device reaching said lower threshold level.

* * * * *

UNITED STATES PATENT AND TRADEMARK OFFICE
CERTIFICATE OF CORRECTION

PATENT NO. : 5,973,819
DATED : October 26, 1999
INVENTOR(S) : Timothy A. Pletcher et al.

It is certified that error appears in the above-identified patent and that said Letters Patent is hereby corrected as shown below:

Title page,
After Inventors:, change "Timotny" to -- Timothy --.

Column 16, claim 1,
Line 20, delete "for".

Column 16, claim 3,
Line 47, delete ":" after "wherein".

Column 16, claim 6,
Line 60, delete ":" after "wherein".

Column 17, claim 10,
Line 39, delete ":" after "wherein".

Column 17, claim 12,
Line 60, delete ":" after "wherein".

Column 18, claim 13,
Line 1, delete ":" after "wherein".

Column 18, claim 15,
Line 10, delete ":" after "wherein".

Column 18, claim 16,
Line 21, delete ":" after "wherein".

UNITED STATES PATENT AND TRADEMARK OFFICE
CERTIFICATE OF CORRECTION

PATENT NO. : 5,973,819
DATED : October 26, 1999
INVENTOR(S) : Timothy A. Pletcher et al.

It is certified that error appears in the above-identified patent and that said Letters Patent is hereby corrected as shown below:

<u>Column 18, claim 19,</u>
Line 33, after "system" insert -- comprises --.
Line 34, after "device" remove "," and insert -- ; --.

Signed and Sealed this

Sixth Day of November, 2001

*Attest:*

*Attesting Officer*

NICHOLAS P. GODICI
*Acting Director of the United States Patent and Trademark Office*